United States Patent Office 2,702,701
Patented Feb. 22, 1955

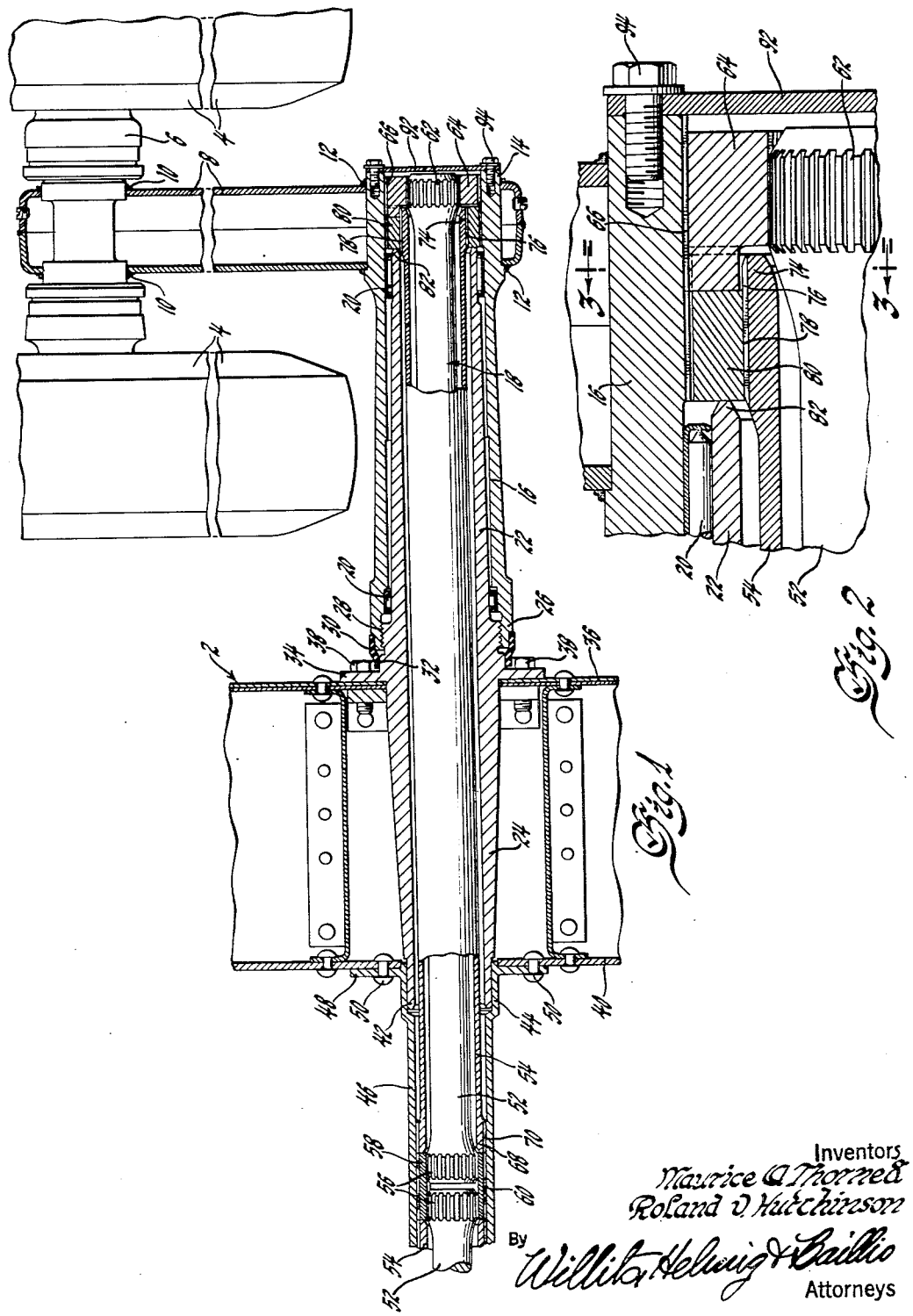

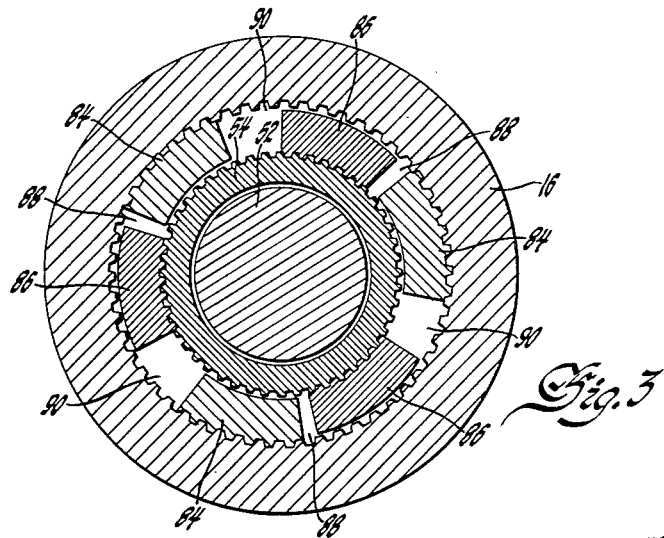
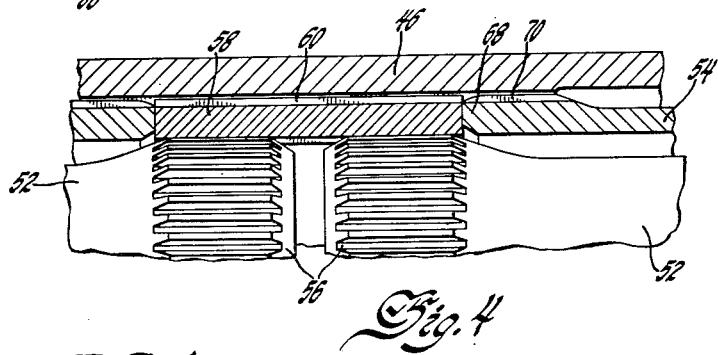
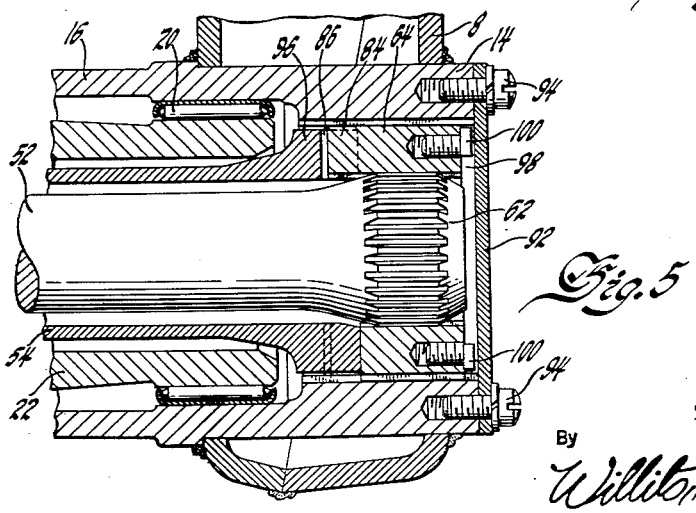

2,702,701

VEHICLE SUSPENSION

Maurice A. Thorne, Detroit, and Roland V. Hutchinson, Birmingham, Mich., assignors to General Motors Corporation, Detroit, Mich., a corporation of Delaware Application April 2, 1952, Serial No. 280,148

8 Claims. (Cl. 267—57)

This invention relates to load supporting or suspension springs, and more particularly to suspension springs of the torsion bar type.

Suspension springs employed in vehicles are subjected to widely varying stresses during normal operation thereof. This is especially true of amphibious carriers, tanks, and the like, which at times operate over rough terrain and often are subjected to sudden jars and shock. The suspension springs for vehicles therefore must be sufficiently heavy to withstand such jars and shocks. The suspensions heretofore employed in such vehicles have been relatively stiff and therefore while being capable of sustaining heavy or sudden loads are not sufficiently flexible to provide the desired ride qualities.

One object of the present invention is to provide a suspension for vehicles which is both flexible thereby insuring good ride qualities, and at the same time sufficiently rugged to withstand the most severe conditions of operation.

Another object is to provide a double spring type of suspension one spring of which functions during normal operations of the vehicle and both operate when the vehicle is subjected to extremely bumpy or uneven terrains or to sudden jars and shocks.

A more specific object is to provide a double torsion bar type of suspension wherein one of the torsion bars operates to cushion the vehicle during normal operation and both of which become operative when the vehicle is subject to abnormal conditions.

A still further object is to provide in a double torsion bar construction of the character specified, a novel clutch between the torsion bars and the swing arm of the vehicle whereby but one of the torsion bars operates when the arm is swung between a predetermined arc and both of said torsion bars function when said arm swings through a greater arc.

A still further object is to provide a torsion bar spring suspension for vehicles which is simple in construction, economic in manufacture, and highly durable and efficient in operation.

Other and further objects will become apparent as the description of the invention progresses.

Of the drawings:

Fig. 1 is a plan view, partly in section, of a mounting for one of the wheel units of a vehicle showing the structure of the torsion spring suspension comprising the present invention.

Fig. 2 is an enlarged fragmentary sectional view of a portion of the torsion bar construction showing the clutch mechanism associated therewith.

Fig. 3 is a sectional view taken substantially along line 3—3 of Fig. 2.

Fig. 4 is an enlarged fragmentary view, partly in section, showing the mechanism for anchoring the torsion bars to the supporting framework, and Fig. 5 is an enlarged fragmentary view of one end of a double torsion bar suspension of a modified construction.

Referring to the drawings, the numeral 2 indicates a portion of the framework of a vehicle which may be an amphibious carrier, such as that shown in my co-pending application S. N. 270,658, filed February 8, 1952, or any other type of vehicle construction. A pair of supporting wheels 4 mounted in the usual manner in axle assembly 6 is supported near the outer end of a tubular swing arm 8, the swing arm 8 being secured to the axle assembly by welding, as shown at 10. The other end of arm 8 is secured by welding, as shown at 12, to the outer end 14 of an elongated tubular member 16 operatively connected to the torsion spring suspension indicated generally at 18. Tubular member 16 is journalled on relatively widely spaced needle bearings 20 provided on the outboard portion 22 of an elongated tubular supporting member 24. The inner end 26 of tubular member 16 is provided with internal threads 28 which engage the external threads provided on tubular supporting member 24 thereby providing a threaded pivotal joint between said members. A resilient sleeve 30 secured to the inner end 26 of member 16 engages an enlarged cylindrical portion 32 of supporting member 22 thereby providing a seal for the threaded pivot joint to protect the said joint from foreign matter. Tubular supporting member 22 is provided with a flange 34 intermediate the ends thereof which is secured to the outer side flange 36 of frame 6 by bolts 38. Supporting member 24 extends through aligned apertures provided in the flanges 36 and 40 of frame 2 and the inner reduced end 42 thereof is closely fitted within the enlarged bore 44 of a complementary tubular supporting member 46. Tubular member 46 is provided with a flange 48 which is secured by rivets 50 to the flange 40 of frame 2.

The torsion bar suspension means 18 consists of an inner torsion bar 52 and an outer tubular torsion member 54. The inner end of torsion bar 52 is provided with splines 56 which engage the internal splines provided on a sleeve 58, the outer surface of the latter of which also being splined, as shown at 60, to the internal portion of tubular supporting member 46. The other end of torsion bar 54 is also provided with splines 62 which engage the inner splines provided on an annular clutch member 64. Clutch member 64 is splined, as shown at 66, to the inner surface of tubular member 16 near the outer end of the latter. The inner end 68 of tubular torsion member 54 is also provided with splines 70 which engage the internal splines provided internally of supporting member 46. The opposite end 74 of tubular torsion member 54 is also provided with external splines 76 which engage the internal splines 78 provided on a complementary clutch member 80. The inner surface of clutch member 80 abuts against the outer end 82 of tubular supporting member 22 and, accordingly, is held against axial inward movement. Clutch element 64 is in the form of an annular ring and has extending laterally inwardly thereof three spaced teeth 84. Complementary clutch member 80 is also in the form of an annular ring and also has formed thereon three spaced outwardly extending teeth 86. As shown in Fig. 3, the teeth 84 and 86 are spaced apart, as shown at 88, on the power or upward movement of the wheels a distance equal to substantially five degrees and on the opposite or rebound side, as indicated at 90, a distance equal to substantially nineteen degrees. This specific spacing of the teeth is simply given by way of example, as any suitable spacing may be effected depending upon the type of vehicle employed without departing from the invention. By spacing the teeth of clutch members 64 and 80, as shown on Fig. 3, it is apparent that should the vehicle be operating over uneven terrain causing the wheels 4 to rise, arm 8 will be swung about supporting member 22, a corresponding amount. Should this movement of arm 8 be five degrees or less, the movement of arm 8 would be resisted entirely by the inner torsion bar 52. Should arm 8, however, swing through an arc greater than five degrees, teeth 84 will engage teeth 86 thereby coupling bar 52 and tubular member 54 together and both will then resist further swinging movement of arm 8. The same is true for the rebound action in case the wheels move over a trench or be otherwise unsupported. Arm 8 would swing in the opposite direction, this movement being resisted by inner torsion bar 52 until the opposite side of teeth 84 engage teeth 86 when both torsion bars will resist further rebound movement. The outer end of tubular member 16 is closed by means of a cover plate 92 which is attached thereto by stud bolts 94 or other securing means. Plate 92 is provided to protect the torsion bars against moisture or other foreign matter. The torsion bars 52 and 54 just described are associated with the wheels 4 provided at one side of the vehicle. A similar pair of torsion bars 52 and 54 are associated with a similar pair of wheels disposed at the opposite side of the vehicle. These torsion bars, as shown in Fig. 1, are in substantially axial alignment.

Fig. 5 shows a somewhat modified construction. Instead of employing a separate complementary clutch member in the form of a ring, as shown at 80 in Fig. 1, the tubular torsion member 54 is provided with an enlarged end 96 having spaced, outwardly, extending teeth 86 provided thereon which are adapted to engage the teeth 84 extending inwardly of the clutch member 64 splined to both the outer end of torsion bar 52 and also to the outer end 14 of tubular member 16. Clutch element 64 is held against axial displacement into the clearance space 98 between the outer side thereof and cover plate 92 by set screws 100 or by any other suitable means. Set screws 100 may also be provided between plate 92 and the clutch element 64, shown in Figs. 1 and 2, if it is so desired.

From the foregoing description it is seen that a simple and highly efficient side suspension has been provided which assures improved ride qualities and at the same time is capable of withstanding the most severe shocks to which the vehicle may be subjected. By providing a double torsion bar suspension wherein one of the torsion bars functions during normal loads a somewhat resilient ride is assured. The second torsion bar is provided to cooperate with the first torsion bar when the vehicle is subjected to abnormal or unusual loads.

The embodiments herein shown and described have been presented simply for the purpose of illustration, it being apparent that certain changes and modifications may be made therein without departing from the invention. It therefore is to be understood that the invention herein shown and described is to be limited only by the scope of the claims which follow.

I claim:

1. A vehicle suspension, comprising, a frame, an elongated tubular supporting member secured to said frame, a torsion member anchored at one end within said tubular supporting member, a tubular torsion member surrounding said first torsion member and having one end anchored within said supporting member adjacent to the anchored end of said first torsion member, means for imposing a variable force on said first mentioned torsion member, and clutch means disposed adjacent the opposite ends of said first and second torsion members providing a lost motion connection therebetween, whereby said first torsion member may be twisted through a predetermined angle before becoming coupled to said tubular torsion member when both of said torsion members then resist the force imposed by said force transmitting means, said clutch means comprising one or more circumferentially spaced axially extending teeth operatively associated with said first and second torsion members.

2. A vehicle suspension, comprising, a frame, an elongated tubular supporting member secured to said frame, a torsion member anchored at one end within said tubular supporting member, a tubular torsion member surrounding said first torsion member and having one end anchored within said supporting member, a vehicle supporting wheel, axle means connected to said wheel, a swing arm secured to said axle and rotatably supported on said tubular supporting member, a clutch element operatively connecting said swing arm to said first torsion member, and a second clutch element operatively connected to said tubular torsion member and adapted to engage said first clutch element to couple said first and second mentioned torsion members for joint operation.

3. A vehicle suspension, comprising, a frame, an elongated supporting member secured to said tubular member, a sleeve secured within said tubular member, a torsion member splined at one end to said sleeve, a tubular torsion member surrounding said first torsion member and having one end splined to said tubular supporting member, means for imposing a variable force on said first mentioned torsion member, clutch means providing a lost motion connection between said first and second mentioned torsion members whereby said first torsion member may be twisted through a predetermined angle before becoming coupled to said tubular torsion member when both of said torsion members then resist the force imposed by said force transmitting means.

4. A vehicle suspension, comprising, a frame, an elongated tubular suporting member secured to said frame, a sleeve secured within said tubular supporting member, a torsion member splined at one end to said sleeve, a tubular torsion member surrounding said first torsion member and having one end splined to the interior of said tubular supporting member, a vehicle wheel, axle means connected to said wheel, a swing arm secured to said axle means and rotatably supported on said tubular supporting member, a clutch operatively connecting said swing arm to said first torsion member, and a second clutch element operatively connected to said tubular torsion member and adapted to engage said first clutch element to couple said first and second torsion members together for joint operation when said swing arm swings through a predetermined angle.

5. A vehicle suspension, comprising, a frame, an elongated tubular supporting member secured to said frame, a sleeve secured within said tubular supporting member, a torsion member splined at one end to said sleeve, a tubular torsion member surrounding said first torsion member and having one end splined to the interior of said tubular supporting member, a vehicle wheel, axle means connected to said wheel, a swing arm secured to said axle means, a tubular extension secured to said swing arm, anti-friction means for rotatably supporting said tubular extension on said tubular support member, a clutch element splined to said tubular extension and to said first torsion member, and a second clutch element operatively connected to said tubular torsion member and adapted to engage said first clutch element to couple said first and second mentioned torsion members for joint operation upon predetermined movement of said swing arm.

6. The vehicle suspension set forth in claim 5, comprising, spaced teeth on said first and second clutch elements, the teeth on one of said clutch elements being so spaced with respect to the teeth on the other of said clutch elements that said swing arm may swing a greater distance in one direction than in the other before the teeth on said clutch elements engage to couple said first and second torsion members together.

7. A vehicle suspension, comprising, a frame, an elongated tubular supporting member secured to said frame, a torsion member anchored at one end within said tubular supporting member, a tubular torsion member surrounding said first torsion member and having one end anchored within said supporting member, a vehicle supporting wheel, axle means connected to said wheel, a swing arm secured to said axle means, means for rotatably supporting said swing arm on said tubular member, a toothed clutch element secured to said first torsion member and operatively connecting said first torsion member to said swing arm, a second toothed clutch element integral with said tubular torsion member and the teeth on said clutch elements being so spaced that said first torsion member may be twisted by movement of said swing arm through a predetermined angle before the said teeth engage when both of said torsion members are then coupled together to resiliently resist further movement of said swing arm.

8. A vehicle suspension as claimed in claim 7 wherein the teeth on one of said clutch elements are so spaced with respect to the teeth on the other clutch element that said swing arm may move through a greater angle in one direction than in the other before the said teeth engage to couple said torsion members together for joint operation.

References Cited in the file of this patent

UNITED STATES PATENTS

| 2,267,917 | Hickman | Dec. 30, 1941 |
| 2,590,711 | Krotz | Mar. 25, 1952 |
| 2,606,759 | Colby | Aug. 12, 1952 |

FOREIGN PATENTS

| 272,974 | Switzerland | Jan. 15, 1951 |
| 609,444 | Germany | Feb. 15, 1935 |